Apr. 10, 1923.
B. SANTINI
1,451,054
NONSKID TIRE PROTECTOR
Filed May 3, 1922
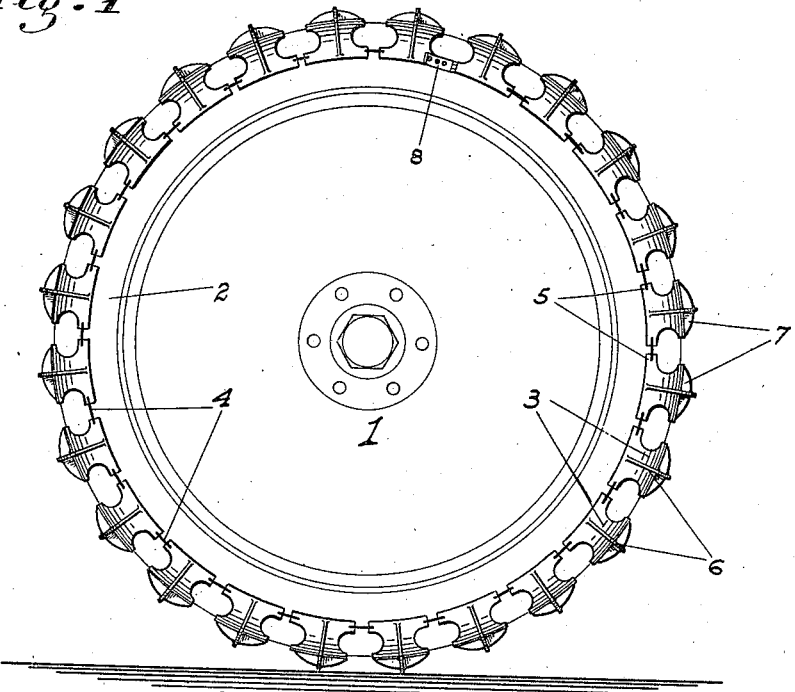
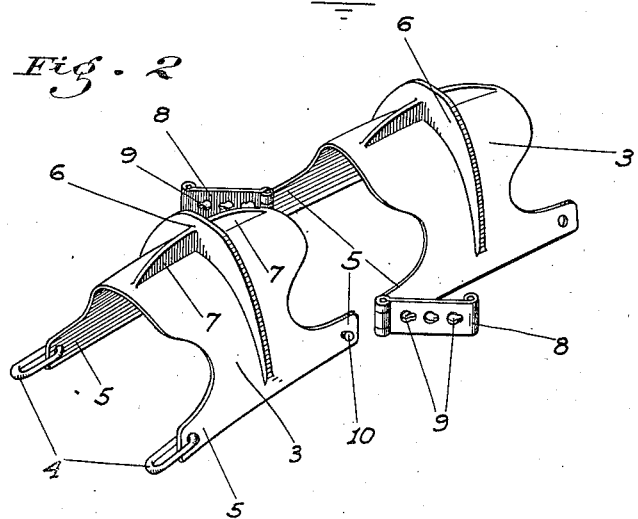
INVENTOR.
Battista Santini
BY
ATTORNEY Patented Apr. 10, 1923.

1,451,054

UNITED STATES PATENT OFFICE.

BATTISTA SANTINI, OF ROSEVILLE, CALIFORNIA.

NONSKID TIRE PROTECTOR.

Application filed May 3, 1922. Serial No. 558,202.

*To all whom it may concern:*

Be it known that I, BATTISTA SANTINI, a citizen of the United States, residing at Roseville, county of Placer, State of California, have invented certain new and useful Improvements in Nonskid Tire Protector; and I do declare the following to be a full, clear, and exact description of the same, reference being had to the accompanying drawings and to the characters of reference marked thereon, which form a part of this application.

This invention relates to a non-skid and tire protecting device especially adapted to be used on the pneumatic tires such as are now almost universally used on automobiles.

These tires, as is well known, have a considerable tendency to skid or lose traction when travelling over slippery or muddy roads, and in sand and the like. Also, when stretches of road formed only of loose rock are encountered, which is quite frequently, the rubber or composition casings forming the outer members of the tires are badly cut and worn by contact with the sharp edges thereof.

Chains are used considerably to prevent skidding, but these exert a harmful effect on the tires, and many motorists will not use them for this reason.

The principal object of my invention therefore is to provide a substantially continuous structure, adapted to be placed about the tire, and which will not only protect it from bruising and the like, but will insure good traction and non-skidding properties under all road conditions.

A second object is to provide means for enabling the device to be easily placed on or removed from the tire.

A further object of the invention is to produce a simple and inexpensive device and yet one which will be exceedingly effective for the purposes for which it is designed.

These objects I accomplish by means of such structure and relative arrangement of parts as will fully appear by a perusal of the following specifications and claims.

In the drawings similar characters of reference indicate corresponding parts in the several views.

Fig. 1 is a side elevation of the wheel showing my improved non-skid device mounted on the tire.

Fig. 2 is a perspective view of the two shoes at the ends of the structure, showing the detachable fastening means.

Referring now more particularly to the characters of reference on the drawings, the numeral 1 denotes a wheel having the usual tire 2. My device, adapted to be placed about the latter, comprises a plurality of metal shoes 3, curved transversely to fit the cross section contour of the tire, and also curved longitudinally to fit the circumferential curve of the tire.

The shoes are spaced apart somewhat when in position and all but the two end ones are connected to each other by short links 4 flexibly mounted on lugs or ears 5 projecting from both ends and sides of the shoes adjacent the edges thereof nearest the center of the wheel.

Intermediate the ends of each shoe is a transverse cleat 6 projecting outwardly of the shoe at the tread portion thereof, and merging into the sides adjacent the edges thereof. Each shoe also has a longitudinal ridge or grouser 7 projecting centrally of the tread of the shoe on both sides of the cleat 6, and preferably of lesser height than the same, the ridge sloping down to and merging with the shoe surface adjacent the ends of the shoe.

The grousers or cleats 6 are of great service in giving traction to the wheel when travelling through mud and sand, while the longitudinal ridges prevent side-slip under such conditions.

The two end shoes, as stated, are normally disconnected from each other, but are arranged to be detachably secured together by any suitable means, as for instance plates 8 hinged to the lugs 5 of one shoe for lateral movement relative thereto, said plates each having a plurality of holes 9 spaced circumferentially of the shoes, any one of which in each plate is adapted to receive a fixed pin 10 projecting outwardly from the corresponding lug 5 on the adjacent end of the adjacent shoe. The same sized protector will therefore serve with tires of different tread-thicknesses.

The device may be installed in much the same manner as the chains now used to prevent skidding. That is, the shoes are separated at their detachable connection ends, and laid out flat on the ground. The wheel is then run thereon, and the end shoes are raised about the wheel and fastened together. If the tire is first deflated somewhat, and then pumped up tightly after the shoe structure is in place, the latter will be firmly clamped with the tire, and no relative rotation will be had.

The shoes may be made as light castings, or may be pressed out of sheet metal, the corners or edges nearest the tire being rounded to avoid cutting the tire.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent, is:—

A tire protector comprising a plurality of shoes connected together and forming a continuous structure adapted to be placed about a tire, two adjacent shoes being normally disconnected from each other, plates hinged to the free ends of one of said shoes for lateral swinging movement relative thereto and provided with orifices spaced lengthwise thereof and pins fixed to and projecting outwardly from the free ends of the other shoe and adapted to project through any at a time of said orifices.

In testimony whereof I affix my signature.

BATTISTA SANTINI.